(12) United States Patent
Chang et al.

(10) Patent No.: US 12,483,120 B2
(45) Date of Patent: Nov. 25, 2025

(54) POWER SUPPLY SYSTEM WITH POWER FACTOR CORRECTION(PFC) AND CONTROL METHOD THEREOF (71) Applicant: Richtek Technology Corporation, Zhubei (TW)

(72) Inventors: Wei-Hsu Chang, Hsinchu (TW); Kun-Yu Lin, Hsinchu (TW); Jyun-Che Ho, Chiayi (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 211 days.

(21) Appl. No.: 18/409,078

(22) Filed: Jan. 10, 2024

(65) Prior Publication Data

US 2025/0132664 A1 Apr. 24, 2025

(30) Foreign Application Priority Data

Oct. 24, 2023 (TW) .................................. 112140605

(51) Int. Cl.
*H02M 1/42* (2007.01)
*H02M 1/00* (2006.01)
*H02M 3/335* (2006.01)

(52) U.S. Cl.
CPC ....... *H02M 1/4208* (2013.01); *H02M 1/0009* (2021.05); *H02M 3/33571* (2021.05)

(58) Field of Classification Search
CPC ............. H02M 1/0009; H02M 1/4208; H02M 3/33571
USPC ...................................................... 363/21.12
See application file for complete search history.

(56) References Cited

U.S. PATENT DOCUMENTS

| | | | |
|---|---|---|---|
| 7,319,600 B2 | 1/2008 | Lee et al. | |
| 7,489,532 B2 | 2/2009 | Shih | |
| 9,166,483 B2 * | 10/2015 | Levy | H05B 45/385 |
| 11,563,372 B2 | 1/2023 | Kim et al. | |
| 2017/0085183 A1 * | 3/2017 | Notsch | H02M 1/44 |
| 2022/0385195 A1 * | 12/2022 | Liu | H02M 3/33576 |
| 2023/0402914 A1 * | 12/2023 | Rai | H02M 1/0019 |

* cited by examiner

*Primary Examiner* — Yemane Mehari
(74) *Attorney, Agent, or Firm* — Tung & Associates (57) ABSTRACT

A power supply system with power factor correction, includes: an AC rectifier, a power factor correction (PFC) conversion circuit, an asymmetric half-bridge (AHB) flyback converter and a communication protocol power delivery (PD) interface. When a power level of an adapter output power is lower than a power threshold, and a converted voltage of a converted power is higher than a first voltage threshold, the communication protocol PD interface generates a disable signal to disable a PFC conversion of the PFC conversion circuit, when the PFC conversion is disabled, the PFC conversion circuit operates a bypass coupling operation, as thus, the converted voltage is equal to a rectified voltage of a rectified power.

21 Claims, 9 Drawing Sheets

| | | | | | | | |
|---|---|---|---|---|---|---|---|
| 1 | 265Vrms (375Vpp) | 400V | 48V | 3A | 6 | 144W | 66.7V | 0.72 | Enable PFC Conversion |
| 3 | 85Vrms (120Vpp) | 400V | 48V | 3A | 6 | 144W | 66.7V | 0.72 | Enable PFC Conversion |
| 5 | 85Vrms (120Vpp) | 120V | 16V | 3A | 6 | 48W | 14.17V | 0.8 | Disable PFC Conversion |

Fig. 5

| Condition | VAC | VCN | VDD/VDDmax | Imax | n | Pout/Pmax | Vd (VCN/n) | D/Dmax | PFC Conversion |
|---|---|---|---|---|---|---|---|---|---|
| 2 | 265Vrms (375Vpp) | 375V | 5V | 3A | 6 | 15W | 44.1V | 0.08 | Disable PFC Conversion |
| 4 | 85Vrms (120Vpp) | 120V | 5V | 3A | 6 | 15W | 14.17V | 0.25 | Disable PFC Conversion |

POWER SUPPLY SYSTEM WITH POWER FACTOR CORRECTION(PFC) AND CONTROL METHOD THEREOF

CROSS REFERENCE

The present invention claims priority to TW 112140605 filed on Oct. 24, 2023.

BACKGROUND OF THE INVENTION

Field of Invention

The present invention relates to a power supply system with power factor correction (PFC); particularly, it relates to such power supply system with PFC which determines whether to disable a PFC conversion according to an adapter output power. The present invention also relates to a control method of the power supply system.

Description of Related Art

Figure 1A:
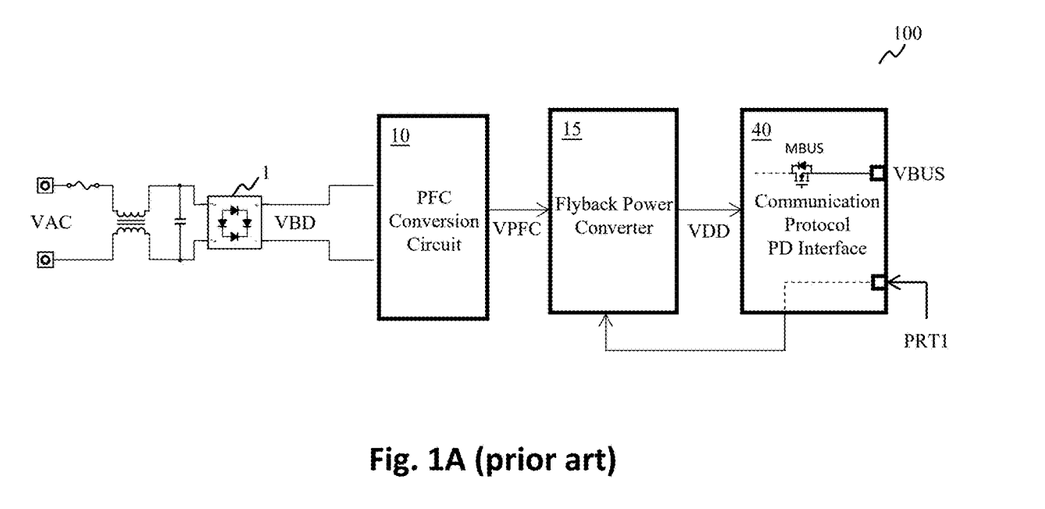
FIG. 1A shows a schematic diagram of a prior art power supply system.

Referring to FIG. 1A, FIG. 1A illustrates a schematic diagram of a prior art power supply system 100. As shown in FIG. 1A, the prior art power supply system 100 includes an AC rectifier 1, a power factor correction (PFC) conversion circuit 10, a flyback power converter 15, and a communication protocol power delivery (PD) interface 40. The AC rectifier 1 rectifies an AC input voltage VAC to generate a rectified voltage VBD. The power factor correction conversion circuit 10 is configured to perform power factor correction conversion to convert the rectified voltage VBD to generate a power factor correction converted voltage VPFC. The power factor correction conversion circuit 100 includes a boost power stage circuit to boost the rectified voltage VBD to the PFC converted voltage VPFC, wherein the power factor correction conversion circuit 10 corrects the power factor of the power supply system 100.

Figure 1B:
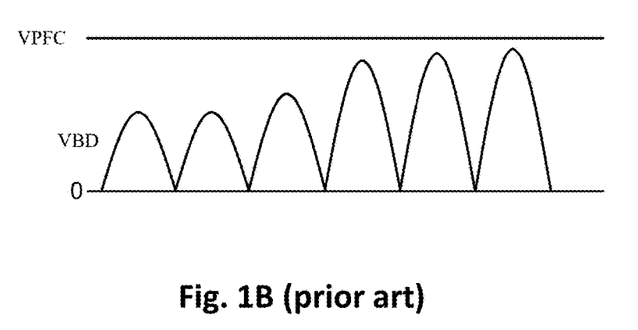
FIG. 1B shows waveforms of an input voltage and an output voltage of a prior art power supply system.

Referring to FIG. 1B, FIG. 1B is a waveform diagram of the rectified voltage VBD and the PFC converted voltage VPFC in the prior art power supply system. As shown in FIG. 1B, after rectification by the AC rectifier 1, the waveform of the rectified voltage VBD is a full wave rectified sine wave above zero. Through the power factor correction conversion performed by the power factor correction circuit 10, a direct current PFC converted voltage VPFC is generated. The PFC converted voltage VPFC is typically a fixed value higher than a peak value of the rectified voltage VBD.

The buck-boost power converter 15 is configured to convert the PFC converted voltage VPFC to generate an adapter output voltage VDD in a direct current-to-direct current manner, and to supply electrical power to the communication protocol PD interface 40. The communication protocol PD interface 40 is configured to transmit relevant information to the buck-boost power converter 15 according to a first communication protocol information PRT1, thereby determining the adapter output voltage VDD. The communication protocol PD interface 40 also controls the power path switch MBUS therein to transmit the adapter output voltage VDD to the power supply pin VBUS therein, thereby supplying the adapter output voltage VDD to circuits (not shown) coupled externally. The aforementioned power supply system 100 is commonly used for traditional traveler adapters that output relatively fixed power and output voltage.

For a traveler adapter complying with the latest Universal Serial Bus Power Delivery (USBPD) specifications, it needs to provide output power ranging from 5V/5 A (equivalent to 25 W) to 20V/5 A (equivalent to 100 W). As per the USB PD Extended Power Range (EPR) protocol, the maximum output power can reach 48V/5 A (equivalent to 240 W). According to the IEC61000-3-2 standard, appliances with an input power equal to or larger than 75 W (of Class-D devices) must be compliant to a maximum amplitude limit of line-frequency harmonics, specifically the 39th harmonic. Consequently, when an USB PD traveler adapter is capable of outputting electrical power no less than 75 W, the USB PD traveler adapter should include a power supply system 100 as shown in FIG. 1A, which includes the Power Factor Correction (PFC) conversion circuitry 10 to minimize line-frequency harmonics. For the application of USB PD EPR traveler adapters, it's necessary to generate PFC converted voltage VPFC within a general range of AC input voltage VAC, such as from 85 to 265 Vrms, with a nominal voltage, for example, 400V, and the adapter output voltage VDD range, for example, from 5V to 48V.

One of the drawbacks of the USB PD EPR traveler adapter including the aforementioned prior art power supply system 100 is that, with a voltage level of the converted voltage VPFC fixed at 400V, when the rectified voltage VBD is lower (e.g., at 85 Vrms) and/or for applications where the adapter output voltage VDD is lower (e.g., below 20V) or the output power is lower, energy losses in power supply system 100 are relatively higher, resulting in lower conversion efficiency.

Furthermore, when the buck-boost power converter 15 converts the PFC converted voltage VPFC to the adapter output voltage VDD, the prior art buck-boost power converter 15 face challenges in achieving Zero Voltage Switching (ZVS) and tend to experience higher voltage stress. This results in lower conversion efficiency and increased costs.

For other related prior arts, please refer to U.S. Pat. Nos. 11,411,489 and 6,768,655.

In view of the above, to overcome the drawbacks in the prior art, the present invention provides a power supply system with power factor correction (PFC) and a control method thereof, wherein the power supply system determines whether to disable a PFC conversion according to an adapter output power. Because the present invention can determine whether to disable a PFC conversion according to an adapter output power, the power loss is reduced, and the conversion efficiency is improved.

SUMMARY OF THE INVENTION

From one perspective, the present invention provides a power supply system with power factor correction (PFC), including: an AC rectifier, which is configured to operably rectify an AC input power to generate a rectified power; a power factor correction (PFC) conversion circuit, which is configured to operably perform a PFC conversion on the rectified power to generate a converted power, and determine whether to disable the PFC conversion according to a disable signal; an asymmetric half-bridge (AHB) flyback converter, which is configured to operably perform a DC-DC conversion on the converted power to generate an adapter output power; and a communication protocol power delivery (PD) interface, which is configured to operably determine the adapter output power according to a first communication protocol information, and control a power path switch to deliver the adapter output power to a power supply pin; wherein when an electrical power of the adapter output power is lower than a power threshold, and a converted voltage of the converted power is higher than a first voltage threshold, the communication protocol PD interface generates the disable signal to disable the PFC conversion of the PFC conversion circuit.

From another perspective, the present invention provides a control method of a power supply system, including: rectifying an AC input power to generate a rectified power; performing a PFC conversion on the rectified power to generate a converted power, and determining whether to disable the PFC conversion according to a disable signal; performing a DC-DC conversion on the converted power to generate an adapter output power; determining the adapter output power according to a first communication protocol information, and controlling a power path switch to deliver the adapter output power to a power supply pin; and generating the disable signal to disable the PFC conversion when an electrical power of the adapter output power is lower than a power threshold, and a converted voltage of the converted power is higher than a first voltage threshold.

In one embodiment, when the PFC conversion is disabled, the PFC conversion circuit performs a bypass coupling operation, as thus the converted voltage is equal to a rectified voltage of the rectified power.

In one embodiment, after the PFC conversion is disabled, when the converted voltage is lower than a second voltage threshold, the disable signal stops disabling the PFC conversion, wherein the first voltage threshold is not lower than the second voltage threshold.

In one embodiment, the PFC conversion circuit includes a boost follower.

In one embodiment, the power supply system with PFC further includes an opto-coupler, which is coupled between the communication protocol PD interface and the PFC conversion circuit, to deliver the disable signal from the communication protocol PD interface to the PFC conversion circuit.

In one embodiment, the communication protocol PD interface determines whether the electrical power of the adapter output power is lower than the power threshold according to a current sense signal of an adapter output current of the adapter output power which is sensed by a current sense circuit coupled to the AHB flyback converter.

In one embodiment, the communication protocol PD interface determines whether the electrical power of the adapter output power is lower than the power threshold according to an adapter output voltage of the adapter output power, a conduction status of the power path switch and/or a second communication protocol information.

In one embodiment, the first voltage threshold is related to an adapter output voltage of the adapter output power.

In one embodiment, the winding voltage threshold is related to an adapter output voltage of the adapter output power or a turns ratio between a primary windings and secondary windings of a transformer of the AHB flyback converter.

In one embodiment, the communication protocol PD interface determines whether the converted voltage is higher than the first voltage threshold further according to a maximum of a duty ratio of the AHB flyback converter.

In one embodiment, the communication protocol PD interface determines that the electrical power of the adapter output power is lower than the power threshold according to that the adapter output voltage is lower than a first adapter output voltage threshold, wherein the first adapter output voltage threshold is related to an upper limit of an adapter output current of the adapter output power.

In one embodiment, after the PFC conversion is disabled by the PFC conversion circuit, when the communication protocol PD interface determines that the electrical power of the adapter output power is not lower than the power threshold according to that the adapter output voltage is higher than a second adapter output voltage threshold, the disable signal stops disabling the PFC conversion.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention.

Figure 2:
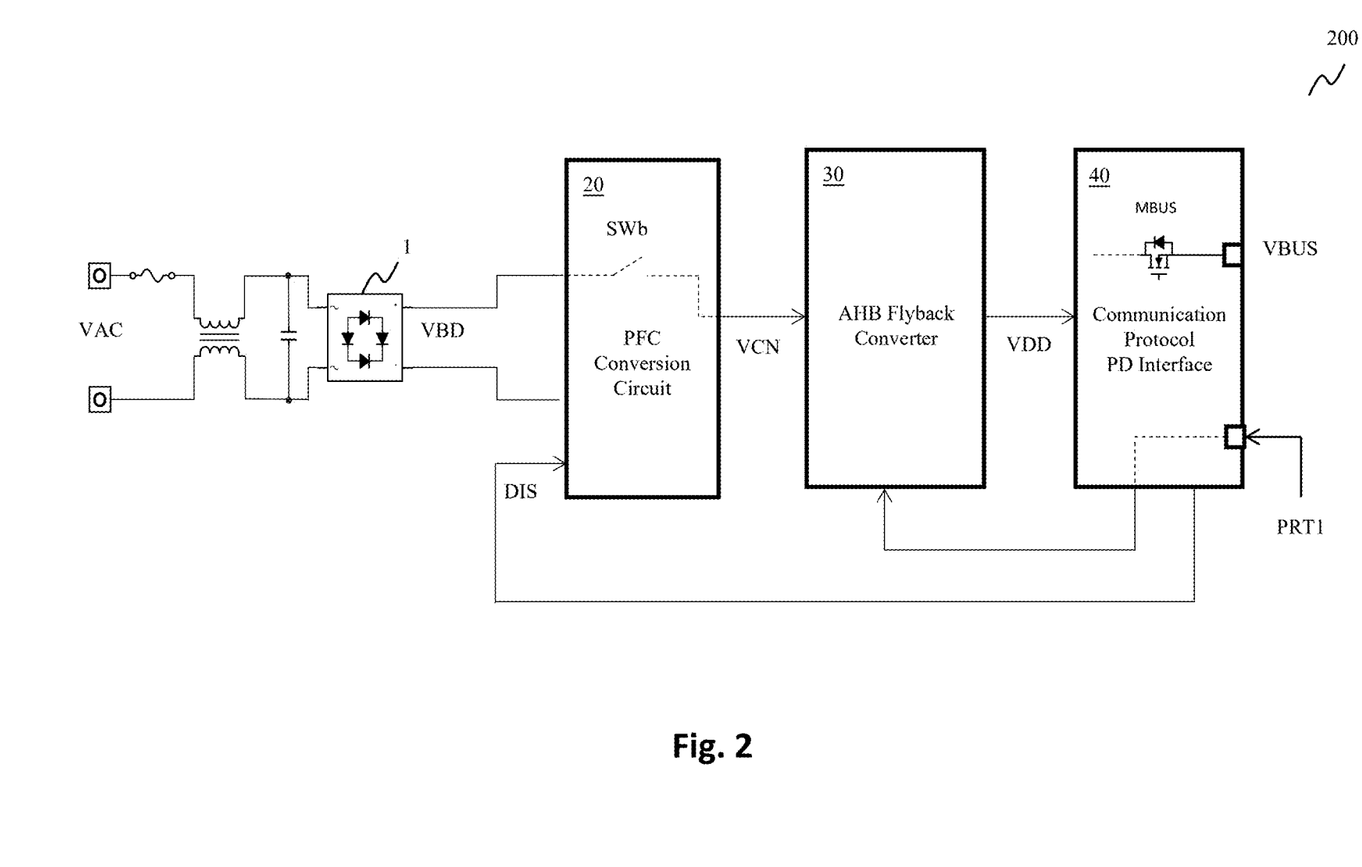
FIG. 2 shows a schematic diagram of an embodiment of a power supply system with PFC of the present invention.

Please refer to FIG. 2, which shows an embodiment of a power supply system with power factor correction (PFC) of the present invention. As shown in FIG. 2, in one embodiment, the power supply system 200 with power factor correction comprises: an AC rectifier 1, a power factor correction (PFC) conversion circuit 20, an asymmetric half-bridge (AHB) flyback converter 30, and a communication protocol power delivery (PD) interface 40. In one embodiment, the AC rectifier 1 rectifies an AC input power to generate a rectified power. The AC input power includes an AC input voltage VAC, and the rectified power includes a rectified voltage VBD. The PFC conversion circuit 20 performs PFC conversion on the rectified power to generate a converted power, and determines whether to disable the PFC conversion according to a disable signal. The converted power includes a converted voltage VCN. The AHB flyback converter 30 converts the converted power in a DC-DC conversion manner to generate an adapter output power, where the adapter output power includes an adapter output voltage VDD.

As shown in FIG. 2, the communication protocol PD interface 40 is configured to deliver related information to the asymmetric half-bridge (AHB) flyback converter 30 according to a first protocol information PRT1, thereby determining the adapter output power. The communication protocol PD interface 40 also controls the power path switch MBUS to deliver the adapter output power to the power supply pin VBUS, thereby supplying the adapter output power to externally coupled circuits.

According to the present invention, when an electrical power of the adapter output power is lower than a power threshold, and a converted voltage VCN of the converted power is higher than a first voltage threshold, the communication protocol PD interface 40 generates the disable signal DIS to disable the PFC conversion of the PFC conversion circuit 20.

In one embodiment, when the PFC conversion is disabled, the PFC conversion circuit 20 performs a bypass coupling operation, as thus the converted voltage VCN is equal to a rectified voltage VBD of the rectified power. In one embodiment, for example, but not limited to as shown in FIG. 2, the PFC conversion circuit 20 performs a bypass coupling operation by controlling a bypass switch SWb to turn ON, thereby electrically connecting the converted voltage VCN to the rectified voltage VBD.

Figure 3:
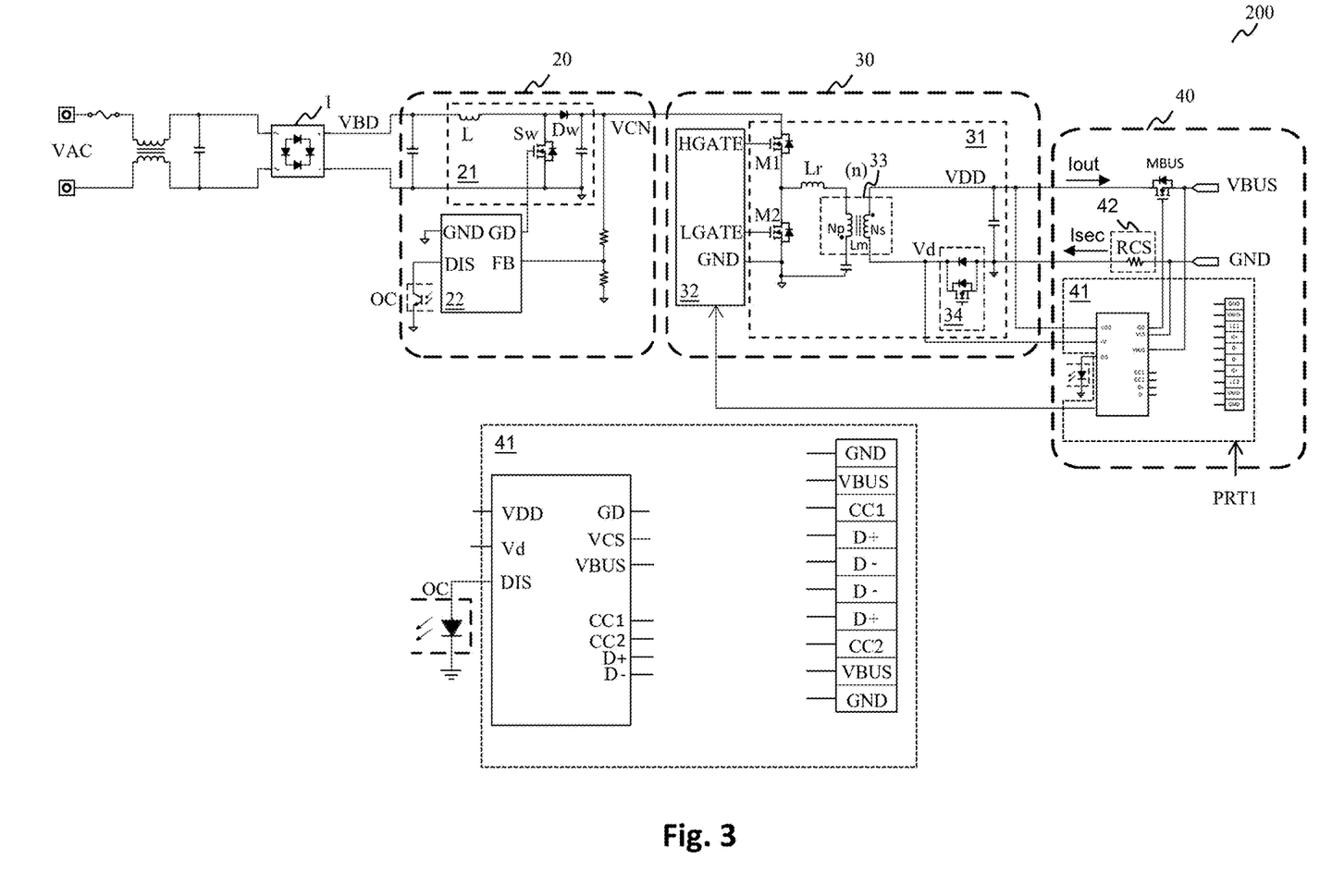
FIG. 3 shows a schematic diagram of a more specific embodiment of a power supply system with PFC of the present invention.

Please refer to FIG. 3, which shows a more specific embodiment of the power supply system with power factor correction of the present invention. As shown in FIG. 3, the power supply system 200 with power factor correction comprises: the AC rectifier 1, the power factor correction (PFC) conversion circuit 20, the Asymmetric Half-Bridge (AHB) flyback converter 30, and the communication protocol power delivery (PD) interface 40.

In this embodiment, the PFC conversion circuit 20 includes a power stage circuit 21 and a power factor correction control circuit 22. In one embodiment, the power stage circuit 21, for example, is a boost power stage circuit, including at least one switch and an inductor L. In this embodiment, the at least one switch in the power stage circuit 21 includes a switch Sw and a diode Dw. The switch Sw corresponds to a lower switch of the power stage circuit 21, while the diode Dw corresponds to the upper switch of the power stage circuit 21. The switch Sw is an N-type metal oxide semiconductor (MOS) device. In other embodiment, the diode Dw may also be replaced as a switch. In one embodiment, the power factor correction conversion circuit 20 performs the PFC conversion to correct the power factor of the rectified power and generate the converted power. The power factor correction control circuit 22 generates a switch operation signal GD according to a feedback signal FB related to the converted voltage VCN, The switch operation signal GD operates the switch Sw to perform PFC conversion on the rectified power source, thereby generating the converted power. Additionally, the power factor correction control circuit 22 determines whether to disable the PFC conversion according to the disable signal DIS.

The power supply system 200, for example but not limited to, regulates the converted voltage VCN to a fixed level. In one embodiment, the fixed level is set at, for example, 400V, corresponding to a relatively lower AC input voltage VAC, such as 85 Vrms. Additionally, in one embodiment, the PFC conversion circuit 20 includes a boost follower, which is a circuit that the output voltage tracks the input voltage. The PFC conversion circuit 20 with the boost follower regulates the converted voltage VCN to a fixed level higher than a peak value of the AC input voltage VAC. Moreover, the converted voltage VCN can be adjusted according to a level of the rectified voltage VBD, ensuring that the converted voltage VCN is positively correlated to the rectified voltage VBD. The PFC conversion circuit 20 with the boost follower has a relatively smaller overall circuit area and lower-cost inductors. Consequently, during the switching and conduction periods of the switch Sw, the electrical loss is relatively lower, thereby enhancing power conversion efficiency and reducing costs.

In this embodiment, the AHB flyback converter 30 includes a power stage circuit 31 with buck characteristics, a power stage control circuit 32, a transformer 33, and a synchronous rectifier (SR) 34. The power stage control circuit 32 generates a high side switch signal HGATE and a low side switch signal LGATE to control switches M1 and M2 respectively, so as to switch one end of a resonant inductor Lr of the power stage circuit 31 between the converted voltage VCN and the ground level GND, thus reducing the converted voltage VCN and providing it to the transformer 33 to convert it into the adapter output voltage VDD. The synchronous rectifier 34 is configured to synchronously rectify the adapter output voltage VDD, which includes a synchronous rectifier switch and a diode to increase rectification efficiency and minimize energy loss. A node between the secondary winding Ns of the transformer 33 and the synchronous rectifier 34 has a synchronous rectified voltage Vd which indicates a level of the converted voltage VCN.

The power supply system 200 includes the AHB flyback converter 30 instead of a conventional flyback converter to achieve zero voltage switching for the switches M1 and M2 and lower voltage stress, thereby increasing the power conversion efficiency. Unlike the conventional flyback converters or typical buck-boost power stage circuits, the AHB flyback converter 30 includes a power stage circuit 31 with buck characteristics. An output end of the AHB flyback converter 30 generates the adapter output voltage VDD, which is lower than the converted voltage VCN at the input end of the AHB flyback converter 30. Under a stable condition of complementary switching between the switches M1 and M2, the adapter output voltage VDD at the output end of the AHB forward converter 30 is the converted voltage VCN divided by n, further multiplied by a maximum duty ratio of the high side switch signal HGATE of the AHB flyback converter (with a value less than 1), wherein n represents the turns ratio between the primary winding Np and the secondary winding Ns of the transformer 33 (n=Np/Ns). Additionally, the AHB flyback converter 30 achieves zero voltage switching (ZVS) for power switches (the switches M1 and M2) in the power stage circuit 31 with buck characteristics, thereby further reducing switching losses.

The communication protocol PD interface 40 is configured to deliver related information to the AHB flyback converter 30 according to the first protocol information PRT1, thereby determining the adapter output power. The communication protocol PD interface 40 also controls the power path switch MBUS to deliver the adapter output power to the power supply pin VBUS, wherein the pin GND is electrically connected to the ground level. The communication protocol PD interface 40 includes a communication protocol related to power delivery (supply and/or receive power). For instance, but not limited to, the communication protocol could be the universal serial bus (USB) PD. An enlarged diagram of the control chip 41 of the communication protocol PD interface 40 (e.g. an USB PD interface) is shown at a lower part in FIG. 3. The first protocol information PRT1, for example, in the USB PD interface, are used to communicate with a circuit (not shown) through pins D+, D−, CC1, CC2, etc., wherein the circuit is electrically connected to the USB PD interface, wherein the circuit for example includes a battery circuit of a phone or a computer powered by the power supply system 200. This communication is utilized to obtain information regarding a target level of the adapter output voltage VDD or other sensed voltage information, sensed current information, etc., and the USB PD interface sends related commands to the PFC conversion circuit 20 and the AHB flyback converter 30 to adjust the adapter output power according to the first protocol information PRT1, based on the needs of the circuit connected at the other end of the USB PD interface.

According to the present invention, when the electrical power of the adapter output power is lower than a power threshold, wherein the power threshold is for example but not limited to 75 W, and the converted voltage VCN of the converted power is higher than a first voltage threshold, the communication protocol PD interface 40 generates the disable signal DIS to disable the PFC conversion of the PFC conversion circuit 20, as thus, the conversion efficiency of the power supply system 200 is increased. In one embodiment, when the PFC conversion is disabled, the PFC conversion circuit 20 performs the bypass coupling operation, as thus the converted voltage VCN is equal to the rectified voltage VBD of the rectified power.

In general, when the PFC converter 20 does not include a boost follower, the converted voltage VCN remains at a relatively higher level (for instance, 400V). As thus, the AHB flyback converter 30 operates under a condition of a lower AC input voltage VAC and a higher converted voltage VCN. However, when the PFC converter 20 operates in the lower AC input voltage VAC and higher conversion voltage VCN condition, a PFC conversion voltage ratio is relatively larger, resulting in a lower PFC conversion efficiency.

To improve the PFC conversion efficiency, a PFC conversion circuit 20 with a boost follower must be employed. The converted voltage VCN varies proportionally with the AC input voltage VAC to increase PFC efficiency. When the electrical power of the adapter output power is lower than the power threshold, wherein the power threshold is for example, but not limited to, 75 W, and the AC input voltage VAC is relatively lower (e.g., 85 Vrms), disabling the PFC conversion in the PFC conversion circuit 20 may result in the execution of a bypass coupling operation. In this case, the converted voltage VCN equals the rectified voltage VBD of the rectified power source, which might not be sufficient for the AHB forward converter 30 to generate the required adapter output voltage VDD (e.g., 48V).

In order to achieve better power conversion efficiency of the power supply system 200 with the adapter output voltage VDD adjustable, wherein the power supply system 200 includes the PFC converter 20 with a boost follower and the AHB flyback converter 30, the present invention incorporates a strategy. When the electrical power of the adapter output power of the AHB flyback converter 30 is lower than a power threshold, for example but not limited to 75 W, and the converted voltage VCN is high enough for the AHB flyback converter 30 to generate the required adapter output voltage VDD, the communication protocol PD interface 40 generates a disable signal DIS to disable the PFC conversion in the PFC conversion circuit 20. In one embodiment, the PFC converter 20 may further performs a bypass coupling operation, such as maintaining the switch Sw in the PFC conversion circuit 20 constantly open when the PFC conversion is disabled, or providing a bypass coupling path that sets the conversion voltage VCN equal to the rectified voltage VBD, thus increasing power conversion efficiency.

In one embodiment, after the PFC conversion is disabled, when the converted voltage VCN is lower than a second voltage threshold, the disable signal DIS stops disabling the PFC conversion, wherein the first voltage threshold is not lower than the second voltage threshold. As thus, disabling the PFC conversion and stopping disabling the PFC conversion have a hysteresis effect. In one embodiment, after the disable signal DIS stops disabling the PFC conversion, the PFC conversion circuit 20 performs a PFC conversion on the rectified power to generate the converted power.

In one embodiment, the communication protocol PD interface 40 determines whether the electrical power of the adapter output power is lower than the power threshold according to a current sense signal VCS of an adapter output current of the adapter output power which is sensed by a current sense circuit 42 coupled to the AHB flyback converter 30. The current sense circuit 42 for example includes a sensing resistor RCS for sensing a sensing current Isec flowing through the sensing resistor RCS, to indicate following parameters: an output current Iout, a conduction status of a synchronous switch in the synchronous rectifier 34, and a conduction status of the power path switch MBUS.

In one embodiment, the communication protocol PD interface 40 determines whether the electrical power of the adapter output power is lower than the power threshold according to an adapter output voltage VDD of the adapter output power, the conduction status of the power path switch MBUS and/or a second communication protocol information. The second protocol information, for example, in the USB PD interface, are used to communicate with a circuit (not shown) through pins D+, D−, CC1, CC2, etc., wherein the circuit is electrically connected to the USB PD interface, wherein the circuit for example includes a battery circuit of a phone or a computer powered by the power supply system 200. This communication is utilized to obtain information regarding a target level of the adapter output voltage VDD or other sensed voltage information, sensed current information, etc. The second protocol information may be the first protocol information PRT1, includes part of the first protocol information PRT1, or includes none of the first protocol information PRT1.

In one embodiment, as shown in FIG. 3, the PFC power supply system 200 further includes an opto-coupler (OC) coupled between the communication protocol PD interface 40 and the PFC conversion circuit 20, to transmit the disable signal DIS from the communication protocol PD interface 40 to the PFC conversion circuit 20.

In one embodiment, the first voltage threshold is related to the adapter output voltage VDD of the adapter output power. From another perspective, the level of the first voltage threshold is used to ensure that the adapter output voltage VDD is sufficient (high enough) for the AHB buck-boost converter 30 to convert the converted voltage VCN to the adapter output voltage VDD. More specifically, when the PFC conversion is disabled, in one embodiment, the PFC conversion circuit 20 performs the bypass coupling operation, as thus the converted voltage VCN is equal to the rectified voltage VBD of the rectified power to increase the power conversion efficiency. At this point, it is necessary to confirm whether the AHB flyback converter 30 with characteristics can convert the converted voltage VCN to the adapter output voltage VDD. Therefore, it is essential to confirm that, in the bypass coupling operation, the level of the converted voltage VCN is sufficient so that after buck conversion by the AHB buck-boost converter 30, it can still provide the required adapter output voltage VDD. Therefore, when the electrical power of the adapter output power is lower than the power threshold, it is necessary to ensure that the voltage VCN is higher than the first voltage threshold. The first voltage threshold is related to regulating a required target of the adapter output voltage VDD, thus the AHB buck-boost converter 30 can generate the required target of the adapter output voltage VDD when the converted voltage VCN is higher than the first voltage threshold.

In one embodiment, the communication protocol PD interface 40 determines whether the converted voltage VCN is higher than the first voltage threshold according to whether the synchronous rectification voltage Vd of the AHB flyback converter 30 is higher than a winding voltage threshold. The winding voltage threshold is related to the adapter output voltage VDD, or the turns ratio (n) of the primary winding Np to the secondary winding Ns of the transformer 33 of the AHB flyback converter 30.

In one embodiment, the communication protocol PD interface 40 determines whether the converted voltage VCN is higher than the first voltage threshold further according to a maximum of a duty ratio of the AHB flyback converter 30.

In one embodiment, the communication protocol PD interface 40 determines that the electrical power of the adapter output power is lower than the power threshold according to that the adapter output voltage is lower than a first adapter output voltage threshold, wherein the first adapter output voltage threshold is related to an upper limit of an adapter output current of the adapter output power.

In one embodiment, after the PFC conversion is disabled by the PFC conversion circuit 20, when the communication protocol PD interface 40 determines that the electrical power of the adapter output power is not lower than the power threshold according to that the adapter output voltage VDD is higher than a second adapter output voltage threshold, the disable signal DIS stops disabling the PFC conversion.

Figure 4:
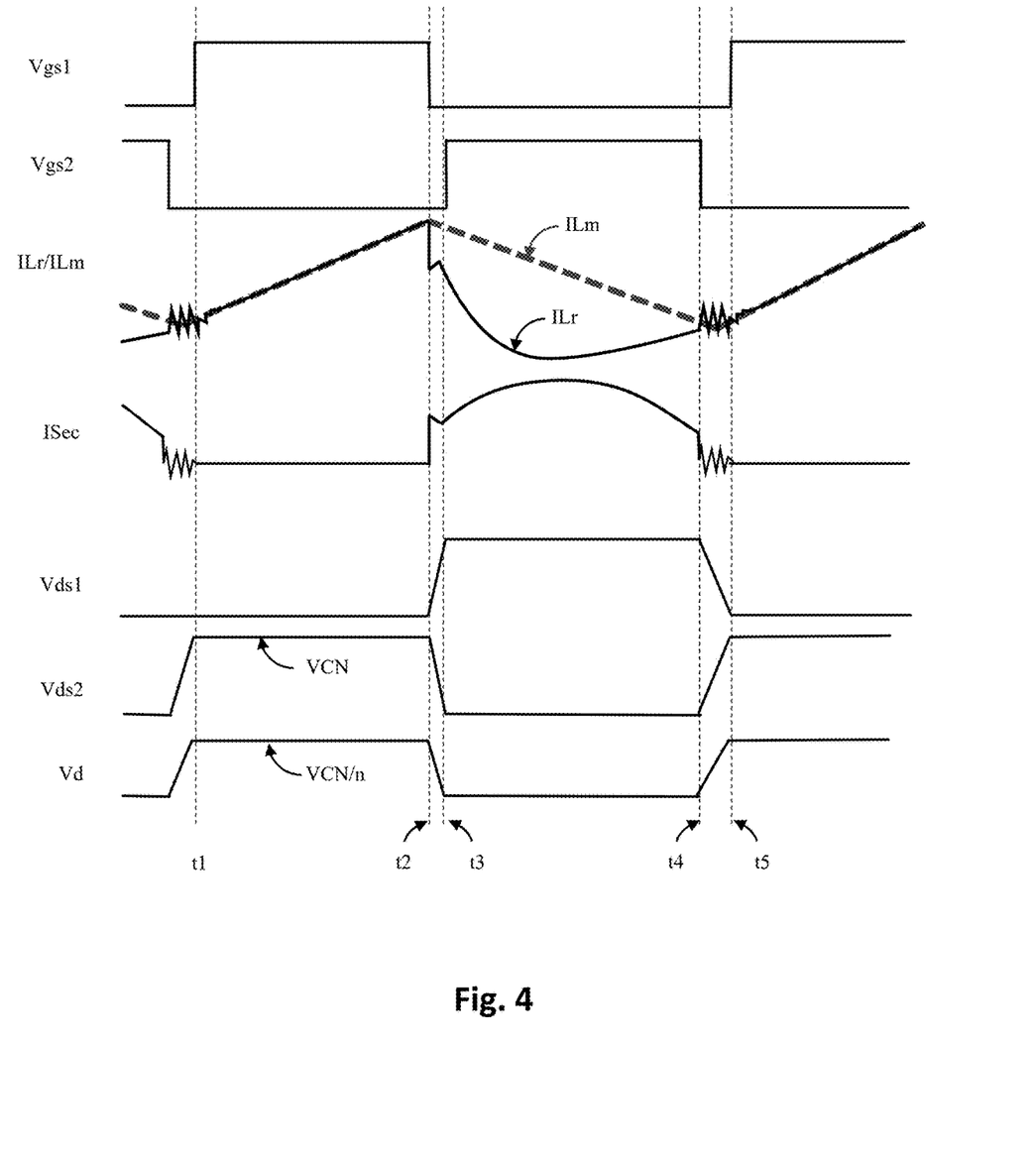
FIG. 4 shows a schematic diagram of operation waveforms of related voltages of an embodiment of a power supply system of the present invention.

Please refer to FIG. 4, which shows waveforms of the output voltage and the rectified voltage in one embodiment of the power supply system of the present invention. As shown in FIG. 4, from a time point t1 to a time point t2, a switch M1 turns ON with its gate-source voltage Vgs1 at a high level. Meanwhile, during this period (from the time point t1 to the time point t2), a switch M2 turns OFF with its gate-source voltage Vgs2 at a low level. Additionally, within the period from the time point t1 to the time point t2, both the resonant inductor Lr and a transformer inductor Im in the power stage circuit 31 with buck characteristics are an magnetizing state, wherein the corresponding resonant inductor current ILr and inductor current ILm flowing through the resonant inductor Lr and inductor Im, respectively, are both increasing. During the period from the time point t1 to the time point t2, due to the ON state of switch M1, a drain-source voltage Vds1 of the switch M1 is at a low level (0V), whereas switch M2 is OFF results in a drain-source voltage Vds2 of the switch M2 being the converted voltage VCN. Within the period from the time point t1 to the time point t2, the synchronous switch of the synchronous rectifier 34 turns OFF. Thus, a synchronous rectification voltage Vd is the converted voltage VCN divided by the turns ratio (n), i.e., VCN/n. The turns ratio (n) is a ratio of the primary winding Np to the secondary winding Ns, and the converted voltage VCN is proportional to a root mean square of the AC input voltage VAC. Therefore, the synchronous rectification voltage Vd is positively related to the AC input voltage VAC.

Still referring FIG. 4, during a period from a time point t3 to a time point t4, the switch M1 turns OFF, and the gate-source voltage Vgs1 of the switch M1 is at a low level. Simultaneously, during this period from the time point t3 to the time point t4, the switch M2 turns ON with the gate-source voltage Vgs2 of the switch M2 at a high level. Moreover, within the time point t3 to the time point t4, both the resonant inductor Lr and the transformer inductor Im of the power stage circuit 31 with buck characteristics are in a demagnetizing state, wherein a resonant inductor current ILr and an inductor current ILm flowing through the resonant inductor Lr and inductor Lm, respectively, are decreasing. The inductor current ILm flowing through the inductor Im is being transferred to the secondary winding Ns of the transformer 33. Additionally, during this period from the time point t3 to the time point t4, the synchronous switch in the synchronous rectifier 34 is conductive, resulting in the synchronous rectification voltage Vd being 0V.

According to the above description regarding the operation of the AHB flyback converter 30, in one embodiment, in the determination of whether the converted voltage VCN is higher than the first voltage threshold according to whether the synchronous rectified voltage Vd is higher than a winding voltage threshold, the synchronous rectified voltage Vd is obtained when the synchronous switch is OFF.

Figure 5:
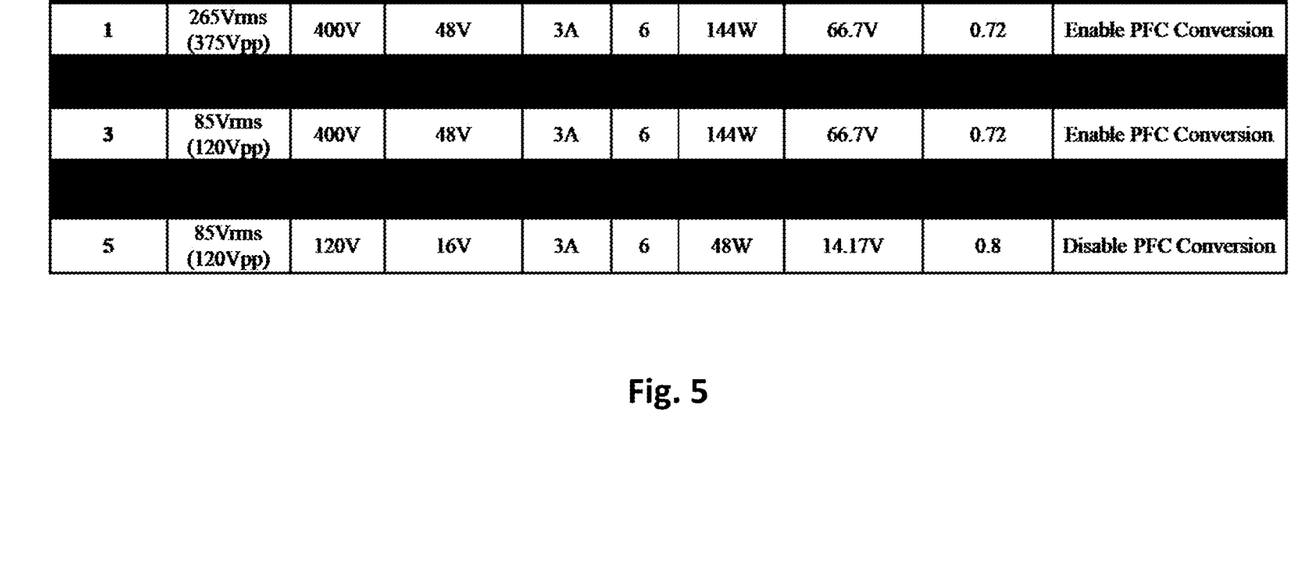
FIG. 5 shows a block diagram of an embodiment of a power supply system of the present invention.

FIG. 5 shows an embodiment according to the present invention. This embodiment indicates that under specific conditions, the present invention filters out scenarios to disable the PFC conversion to be safely done, and detects relevant parameters for potentially disabling the PFC conversion. Coupled with methods such as table lookup and/or circuitry, the communication protocol PD interface 40 generates the disable signal DIS when the electrical power Pout of the adapter output power is lower than a power threshold (in this embodiment, 75 W), and the converted voltage VCN of the converted power is higher than the first voltage threshold. The disable signal DIS disables the PFC conversion of the PFC conversion circuit 20.

In the embodiment shown in FIG. 5 and referring to FIGS. 3 and 4, with a turns ratio (n) of 6, the PFC converter circuit 20 does not include a boost follower, but still incorporates a boost power stage circuit. The maximum current (Imax) of the output current Iout is 3 A. Specifically, when the switch M1 is conductive and the switch M2 and the synchronous switch of the synchronous rectifier 34 are both OFF, the synchronous rectified voltage Vd equals the converted voltage VCN divided by the turns ratio (n).

In a condition 1 shown in FIG. 5, the given conditions are as follows: the root mean square of the AC input voltage VAC is 265 Vrms, which means a peak-to-peak voltage thereof is 375 Vpp. Additionally, the communication protocol PD interface 40 sends relevant information to the AHB flyback converter 30 according to the first communication protocol information PRT1 to determine the adapter output voltage VDD of the adapter output power Pout as 48V, with a maximum duty cycle Dmax of 0.8. With the PFC converter enabled, the converted voltage VCN is 400V. When the PFC conversion of the PFC conversion circuit 20 is disabled, the converted voltage VCN equals the peak-to-peak voltage of the AC input voltage VAC, which is 375 Vpp Therefore, in the condition 1 shown in FIG. 5, if the PFC conversion of the PFC conversion circuit 20 is disabled, the adapter output voltage VDD of 48V can be achieved (since the converted voltage VCN divided by 6 and then multiplied by a duty ratio upper limit Dmax not exceeding 0.8 can reach a maximum of 50V). The synchronous rectified voltage Vd is 66.7V, and the maximum power Pmax of the adapter output power is 144 W, exceeding the power threshold of 75 W. According to the IEC61000-3-2 standard, enabling the PFC conversion is required. In this embodiment, the duty ratio for the adapter output voltage VDD (48) divided by the conversion voltage VCN (400V) multiplied by n (6) is approximately 0.72.

In a condition 2 shown in FIG. 5, the given conditions are as follows: the root mean square of the AC input voltage VAC is 265 Vrms, which means a peak-to-peak voltage thereof is 375 Vpp. Additionally, the communication protocol PD interface 40 determines the adapter output voltage VDD of the adapter output power as 5V according to the first communication protocol information PRT1, with a maximum duty cycle Dmax of 0.8. When the PFC conversion is enabled, the converted voltage VCN is 400V. However, if the PFC conversion of the PFC conversion circuit 20 is disabled, the conversion voltage VCN equals the peak-to-peak voltage of the AC input voltage VAC, which is 375 Vpp.

Therefore, in the condition 2 shown in FIG. 5, the maximum power Pmax of the adapter output power is 15 W, which is lower than the power threshold of 75 W. Additionally, when the converted voltage VCN (375V), divided by 6 and multiplied by a duty ratio upper limit Dmax not exceeding 0.8 (approximately 50V), is sufficient to generate the adapter output voltage VDD, the PFC conversion of the PFC conversion circuit 20 can be disabled to increase conversion efficiency. Thus, in condition 2 illustrated in FIG. 5, according to the present invention, the PFC conversion of the PFC conversion circuit 20 is disabled. This results in a duty ratio of the adapter output voltage VDD (5V) divided by the conversion voltage VCN (375V) multiplied by n (6) of approximately 0.08.

In a condition 3 shown in FIG. 5, the given conditions are as follows: the root mean square of the AC input voltage VAC is 85 Vrms, which means a peak-to-peak voltage thereof is 120 Vpp. Additionally, the communication protocol PD interface 40 determines the adapter output voltage VDD of the adapter output power as 48V with a maximum duty ratio Dmax of 0.8 according to the first communication protocol information PRT1. When the PFC conversion is enabled, the converted voltage VCN is 400V. However, if the PFC conversion of the PFC conversion circuit 20 is disabled, the converted voltage VCN equals the peak-to-peak voltage of the AC input voltage VAC, which is 120 Vpp.

Therefore, in the condition 3 shown in FIG. 5, if the PFC conversion of the PFC conversion circuit 20 is disabled, the adapter output voltage VDD is not able to reach 48V (as the maximum achievable, obtained by dividing the conversion voltage VCN by 6 and then multiplying by a duty ratio upper limit Dmax not exceeding 0.8, would only reach a maximum of 16V). Consequently, in condition 3 shown in FIG. 5, according to the present invention, the PFC conversion of the PFC conversion circuit 20 is not disabled, meaning the PFC conversion remains enabled. This results in a synchronous rectified voltage Vd of 66.7V, and the maximum power Pmax of the adapter output power is 144 W, exceeding the power threshold of 75 W. In this embodiment, the duty ratio for the adapter output voltage VDD (48) divided by the conversion voltage VCN (400V) multiplied by n (6) is approximately 0.72.

In a condition 4 shown in FIG. 5, the given conditions are as follows: the root mean square of the AC input voltage VAC is 85 Vrms, which means a peak-to-peak voltage thereof is 120 Vpp. Furthermore, the communication protocol PD interface 40 determines the adapter output voltage VDD of the adapter output power as 5V with a maximum ratio cycle Dmax of 0.8 according to the first communication protocol information PRT1. When the PFC conversion is enabled, the converted voltage VCN is 400V. However, if the PFC conversion of the PFC conversion circuit 20 is disabled, the converted voltage VCN equals the peak-to-peak voltage of the AC input voltage VAC, which is 120 Vpp.

Therefore, in the condition 4 shown in FIG. 5, the maximum power Pmax of the adapter output power is 15 W, which is lower than the power threshold of 75 W. Additionally, when the converted voltage VCN (120V), divided by 6 and then multiplied by a duty ratio upper limit Dmax not exceeding 0.8 (approximately 16V), is sufficient to generate the adapter output voltage VDD, the PFC conversion of the PFC conversion circuit 20 can be disabled to increase conversion efficiency. Hence, in the condition 4 shown in FIG. 5, according to the present invention, the PFC conversion of the PFC conversion circuit 20 is disabled. This results in a duty ratio for the adapter output voltage VDD (5V) divided by the converted voltage VCN (120V) multiplied by n (6) of approximately 0.25.

From another perspective, the condition 5 shown in FIG. 5 indicates a situation where the root mean square of the AC input voltage VAC is 85 Vrms. When the PFC conversion of the PFC conversion circuit 20 is disabled, the converted voltage VCN equals the peak-to-peak voltage of the AC input voltage VAC, which is 120 Vpp. With a maximum duty ratio limit Dmax of 0.8, the highest adapter output voltage VDD that can be provided is 16V, and the maximum current Imax for the output current Iout is 3 A.

Figures 6A, 6B:
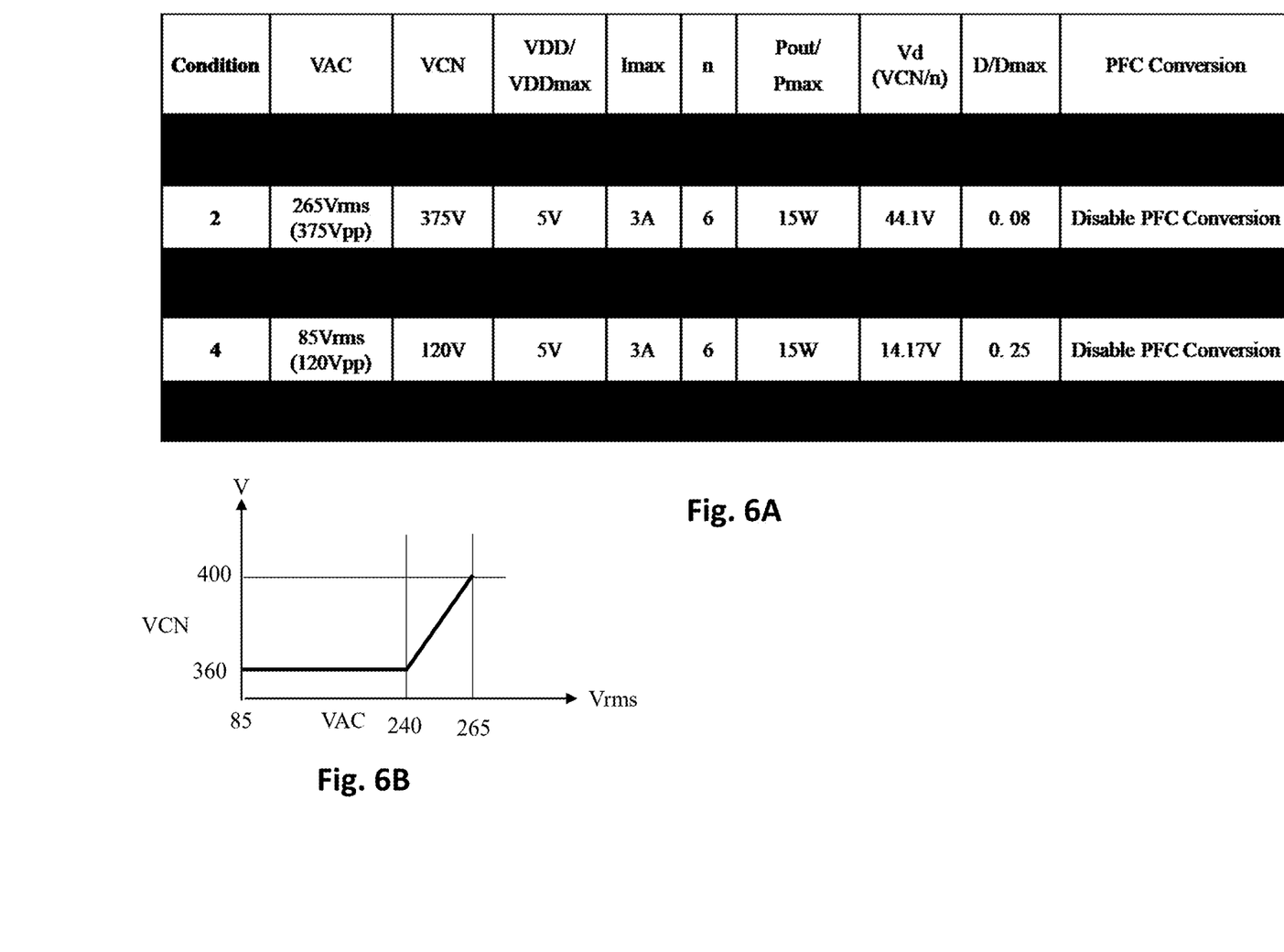
FIGS. 6A and 6B shows a schematic diagram of an embodiment of a PFC conversion circuit of the present invention.

FIGS. 6A and 6B show an embodiment according to the present invention. This embodiment has a similar purpose to FIG. 5, that is, under specific given conditions, intending to identify conditions where the PFC conversion can be safely disabled. Moreover, after relevant parameters for disabling the PFC conversion is sensed, including methods such as table lookup and/or circuitry, when the electrical power of the adapter output power is lower than the power threshold (in this instance, 75 W), and the converted voltage VCN is higher than the first voltage threshold, the communication protocol PD interface 40 generates the disable signal DIS to disable the PFC conversion of the PFC conversion circuit 20.

In this embodiment shown in FIGS. 6A and 6B, also referring to FIGS. 3 and 4, considering a turns ratio (n) of 6, and different from the embodiment shown in FIG. 5, the PFC conversion circuit 20 includes a boost follower. Herein, the characteristic curve of the PFC conversion circuit 20 converting the AC input voltage VAC to the converted voltage VCN is shown in FIG. 6B. It is important to note that when the root mean square of the AC input voltage VAC ranges between 240 Vrms and 265 Vrms, the root mean square of the AC input voltage VAC is proportional to the conversion voltage VCN. However, when the root mean square of the AC input voltage VAC is lower than 240 Vrms, the converted voltage VCN remains fixed at 360V. Similar to the embodiment shown in FIG. 5, the maximum current Imax of the output current Iout is 3 A. Specifically, when the switch M1 is conductive and the switches M2 and the synchronous switch of the synchronous rectifier 34 are all OFF, the synchronous rectified voltage Vd equals the conversion voltage VCN divided by the turns ratio (n).

In a condition 1 shown in FIGS. 6A and 6B, except the PFC conversion circuit 20 further including a boost converter, all other conditions are same as the condition 1 shown in FIG. 5. The given conditions are as follows: the root mean square of the AC input voltage VAC is 265 Vrms, which means a peak-to-peak voltage thereof is 375 Vpp. Additionally, the communication protocol PD interface 40 transmits relevant information to the AHB flyback converter 30 according to the first communication protocol information PRT1, to determine the adapter output voltage VDD of the adapter output power as 48V, with a maximum duty ratio Dmax of 0.8. When the PFC conversion is enabled, the converted voltage VCN is 400V. However, if the PFC conversion of the PFC conversion circuit 20 is disabled, the converted voltage VCN equals the peak-to-peak voltage of the AC input voltage VAC, which is 375 Vpp.

Therefore, in the condition 1 shown in FIGS. 6A and 6B, if the PFC conversion of the PFC conversion circuit 20 is disabled, it would result in achieving the adapter output voltage VDD of 48V. This is because the converted voltage VCN, divided by 6 and multiplied by a duty ratio Dmax not higher than 0.8, could reach a maximum of 50V. Hence, according to this embodiment shown in FIGS. 6A and 6B, the synchronous rectification voltage Vd is 66.7V, and the maximum power Pmax of the adapter output power is 144 W, higher than the power threshold of 75 W. According to the IEC61000-3-2 standard, enabling the PFC conversion is required. In this embodiment, the duty ratio is approximately 0.72, calculated by dividing the adapter output voltage VDD (48) by the conversion voltage VCN (400V) and multiplying it by n (6).

In a condition 2 shown in FIGS. 6A and 6B, the given conditions are as follows: the root mean square of the AC input voltage VAC is 265 Vrms, which means a peak-to-peak voltage thereof is 375 Vpp. The communication protocol interface PD 40 determines the adapter output voltage VDD for the adapter output power as 5V with a maximum duty cycle Dmax of 0.8 according to the first communication protocol information PRT1. When the PFC conversion is enabled, the conversion voltage VCN is 400V. However, if the PFC conversion of the PFC conversion circuit 20 is disabled, the conversion voltage VCN equals the peak-to-peak voltage of the AC input voltage VAC, which is 375 Vpp.

Therefore, in the condition 2 shown in FIGS. 6A and 6B, the maximum power Pmax of the adapter output power is 15 W, which is lower than the power threshold of 75 W. Additionally, dividing the converted voltage VCN (375V) by 6 and then multiplying it by a duty ratio Dmax not higher than 0.8 (approximately 50V) is sufficient to generate the adapter output voltage VDD. Hence, disabling the PFC conversion of the PFC conversion circuit 20 according to the present invention is achievable, to increase the conversion efficiency. Thus, in the condition 2 shown in FIGS. 6A and 6B, according to the present invention, the PFC conversion of the PFC conversion circuit 20 is disabled. This results in a duty ratio approximately around 0.08, calculated by dividing the adapter output voltage VDD (5V) by the conversion voltage VCN (375V) and then divided by n (6).

In a condition 3 shown in FIGS. 6A and 6B, the given conditions are as follows: the root-mean-square of the AC input voltage VAC is 85 Vrms, which means a peak-to-peak voltage thereof is 120 Vpp. The communication protocol PD interface 40 determines the adapter output voltage VDD as 48V, with a maximum duty cycle limit Dmax of 0.8 according to the first communication protocol information PRT1. When the PFC conversion is enabled, the converted voltage VCN is as previously stated at 360V. However, if the PFC conversion of the PFC conversion circuit 20 is disabled, the converted voltage VCN equals the peak voltage of the AC input voltage VAC at 120 Vpp.

Therefore, in the condition 3 shown in FIGS. 6A and 6B, if the PFC conversion of the PFC conversion circuit 20 is disabled, it is unattainable for the adapter output voltage VDD to reach 48V (since the converted voltage VCN divided by 6 and multiplied by the maximum duty ratio limit Dmax, cannot exceed 16V). Thus, in the condition 3 shown in FIGS. 6A and 6B, according to the present invention, the PFC conversion of the PFC conversion circuit 20 is not disabled, meaning it is enabled. This results in the synchronous rectification voltage Vd being 60V, and the maximum power Pmax of the adapter output power supply is 144 W, exceeding the power threshold of 75 W. In this embodiment, the duty ratio is 0.8, calculated as the adapter output voltage VDD (48) divided by the conversion voltage VCN (360V) multiplied by n (6).

In a condition 4 shown in FIGS. 6A and 6B, the given conditions are as follows: the root mean square of the AC input voltage VAC is 85 Vrms, which means a peak-to-peak voltage thereof is 120 Vpp. Furthermore, the communication protocol PD interface 40 determines the adapter output voltage VDD of the adapter output power supply as 5V with a maximum duty ratio limit Dmax of 0.8 according to the first communication protocol information PRT1. When the PFC conversion is enabled, the converted voltage VCN is 360V. However, if the PFC conversion of the PFC conversion circuit 20 is disabled, the converted voltage VCN equals the peak-to-peak voltage of the AC input voltage VAC, which is 120 Vpp.

Therefore, in the condition 4 shown in FIGS. 6A and 6B, the maximum power Pmax of the adapter output power supply is 15 W, which is lower than the power threshold of 75 W. Moreover, dividing the converted voltage VCN (120V) by 6 and then multiplying it by the maximum duty ratio Dmax, which is not more than 0.8 (approximately 16V), is sufficient to generate the adapter output voltage VDD (5V). This enables the disabling of the PFC conversion of the PFC conversion circuit 20, increasing the efficiency of the conversion process. Consequently, according to the present invention in the depicted scenario of FIGS. 6A and 6B, the PFC conversion of the PFC conversion circuit 20 is disabled. This leads to a duty ratio of approximately 0.25, obtained by dividing the adapter output voltage VDD (5V) by the product of the converted voltage VCN (120V) and n (6).

From another perspective, a condition 5 shown in FIGS. 6A and 6B indicates that the root mean square of the AC input voltage VAC is 85 Vrms. When the PFC conversion of the PFC conversion circuit 20 is disabled, the converted voltage VCN equals the peak-to-peak value of the AC input voltage VAC, which is 120 Vpp. When the maximum duty ratio Dmax is set at 0.8, the highest attainable adapter output voltage VDD is 16V, and the maximum current Imax of the output current Iout is 3 A.

Figure 7:
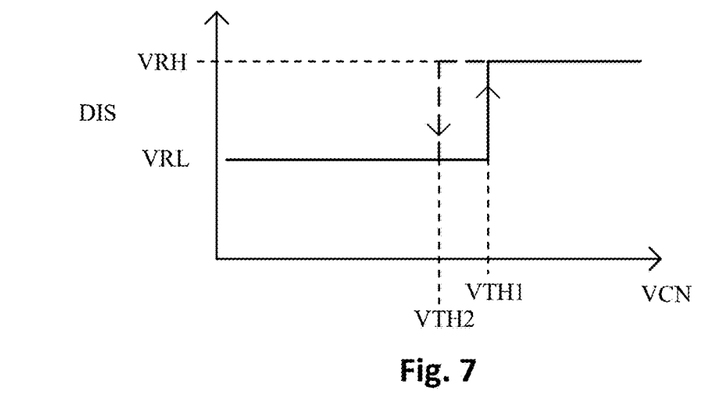
FIG. 7 shows a schematic diagram of a hysteresis relationship between the converted voltage VCN and the disable signal DIS in an embodiment of the present invention.

FIG. 7 shows a hysteresis relationship diagram between the converted voltage VCN and the disable signal DIS in one embodiment. As shown in FIG. 7, when the PFC conversion is enabled, and the converted voltage VCN of the converted power is higher than a first voltage threshold VTH1, the communication protocol PD interface 40 generates a disable signal CIS, which switches the disable signal CIS to a high-level VRH. When the PFC conversion is disabled and the converted voltage VCN is lower than a second voltage threshold VTH2, the disable signal CIS stops disabling the PFC conversion, switching the disable signal CIS to a low-level VRL, where the first voltage threshold VTH1 is not lower than the second voltage threshold VTH2.

Figure 8:
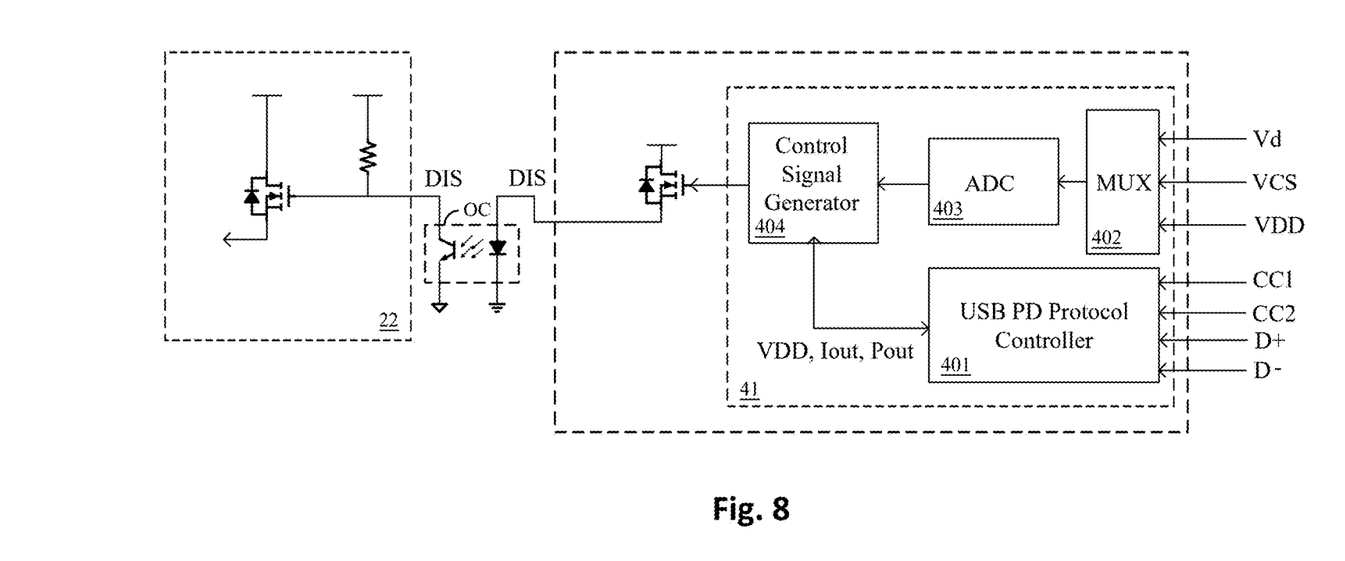
FIG. 8 shows a schematic diagram of a coupling relationship among the control chip 41 of the communication protocol PD interface, the opto-coupler OC, and the PFC control circuit 22 in an embodiment of the present invention.

FIG. 8 is an embodiment of the present invention showing a schematic diagram depicting the coupling relationship between a control chip 41 of the communication protocol PD interface, an opto-coupler OC, and a power factor correction control circuit 22. As shown in FIG. 8, the control chip 41 of the communication protocol PD interface includes USB PD protocol controller 401, a multiplexer (MUX) 402, an analog-to-digital converter (ADC) 403, and a control signal generator 404. Information related to the output current Iout and the adapter output voltage VDD can be obtained by the USB PD protocol controller 401 through pins D+, D−, CC1, CC2, etc., from a circuit connected to the communication protocol PD interface 40 at the other end. The control chip 41 of the communication protocol PD interface can acquire information related to the power of the adapter output power and the adapter output voltage VDD through pins D+, D−, CC1, CC2, etc., of the USB PD protocol controller 401 and transmit it to the control signal generator 404. It can also obtain information related to the synchronous rectified voltage Vd, the current sensing signal VCS, and the adapter output voltage VDD through the multiplexer 402, and after conversion by the analog-to-digital converter 403, transmit the relevant information to the control signal generator 404. The control signal generator 404 generates control signals according to the above information to control switches within the control chip 41 of the communication protocol PD interface.

Figure 9:
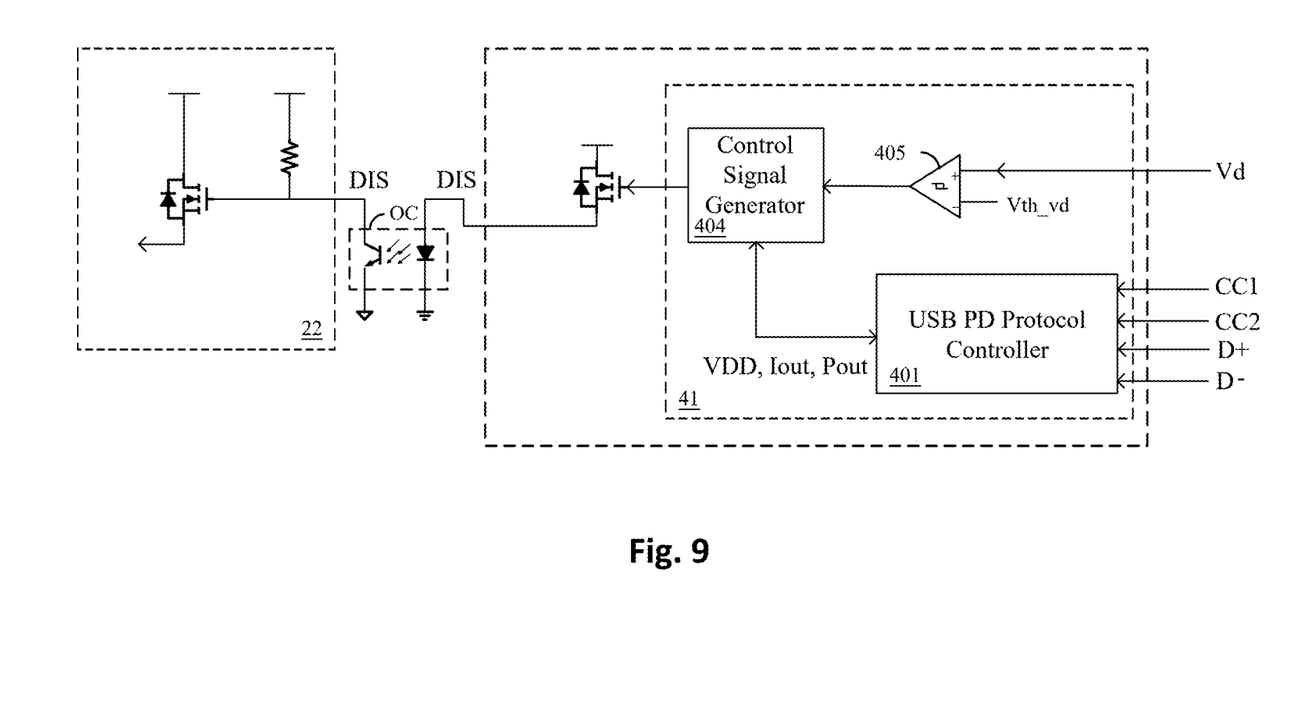
FIG. 9 shows a schematic diagram of a coupling relationship among the control chip 41 of the communication protocol PD interface, the opto-coupler OC, and the PFC control circuit 22 in an embodiment of the present invention.

In an embodiment of the present invention shown in FIG. 9, there is an illustrative diagram depicting the coupling relationship between the control chip 41 of the communication protocol PD interface, the opto-coupler OC, and the power factor correction control circuit 22. As illustrated in FIG. 9, the control chip 41 of the communication protocol PD interface includes a USB PD protocol controller 401, a control signal generator 404, and a hysteresis comparator 405. Different from the control chip 41 of the communication protocol PD interface shown in FIG. 8, the control chip 41 shown in FIG. 9 does not include the multiplexer 402 and the analog-to-digital converter 403 but includes a hysteresis comparator 405. The hysteresis comparator 405 is configured to compare the synchronous rectified voltage Vd with the voltage threshold Vth_vd to determine whether to disable the PFC conversion of the PFC conversion circuit 20. In one embodiment, the voltage threshold Vth_vd includes the aforementioned first voltage threshold and second voltage threshold.

Figure 10:
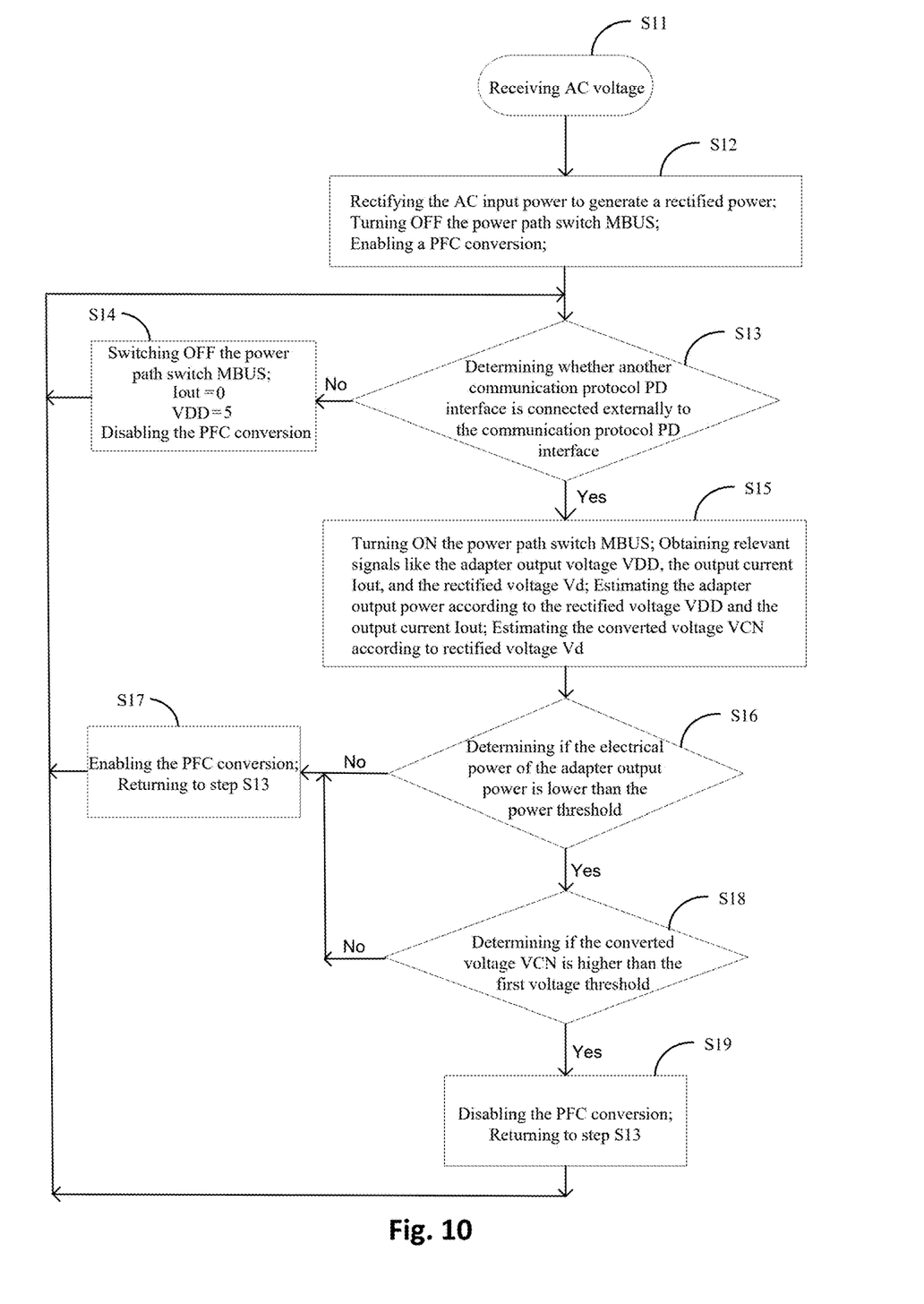
FIG. 10 shows a flowchart of an embodiment of the PFC conversion circuit in the power supply system of the present invention.

FIG. 10 shows a flowchart of an embodiment of the present invention, explaining one embodiment of the power supply system control method according to the present invention. As shown in FIG. 10, the power supply system control method comprises:

Step S11: Receiving AC voltage;
Step S12: Rectifying the AC input power to generate a rectified power; turning OFF the power path switch MBUS; enabling a PFC conversion;
Step S13: Determining whether another communication protocol PD interface is connected externally to the communication protocol PD interface;
Step S14: No, switching OFF the power path switch MBUS; setting the output current Iout to 0, configuring the adapter output voltage VDD to 5V; disabling the PFC conversion; Returning to Step S13;
Step S15: Yes, turning ON the power path switch MBUS; obtaining relevant signals like the adapter output voltage VDD, the output current Iout, and the rectified voltage Vd; estimating the adapter output power according to the rectified voltage VDD and the output current Iout; estimating the converted voltage VCN according to rectified voltage Vd;
Step S16: Determining if the electrical power of the adapter output power is lower than the power threshold;
Step S17: No, enabling the PFC conversion. Returning to step S13;
Step S18: Yes, determining if the converted voltage VCN is higher than the first voltage threshold;
No, enabling the PFC conversion. Returning to step S13;
Step S19: Yes, disabling the PFC conversion; Returning to step S13.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply system with power factor correction (PFC), comprising:
    an AC rectifier, which is configured to operably rectify an AC input power to generate a rectified power;
    a power factor correction (PFC) conversion circuit, which is configured to operably perform a PFC conversion on the rectified power to generate a converted power, and determine whether to disable the PFC conversion according to a disable signal;
    an asymmetric half-bridge (AHB) flyback converter, which is configured to operably perform a DC-DC conversion on the converted power to generate an adapter output power; and
    a communication protocol power delivery (PD) interface, which is configured to operably determine the adapter output power according to a first communication protocol information, and control a power path switch to deliver the adapter output power to a power supply pin;

wherein when an electrical power of the adapter output power is lower than a power threshold, and a converted voltage of the converted power is higher than a first voltage threshold, the communication protocol PD interface generates the disable signal to disable the PFC conversion of the PFC conversion circuit.

2. The power supply system with PFC as claimed in claim 1, wherein when the PFC conversion is disabled, the PFC conversion circuit performs a bypass coupling operation, as thus the converted voltage is equal to a rectified voltage of the rectified power.

3. The power supply system with PFC as claimed in claim 1, wherein after the PFC conversion is disabled, when the converted voltage is lower than a second voltage threshold, the disable signal stops disabling the PFC conversion, wherein the first voltage threshold is not lower than the second voltage threshold.

4. The power supply system with PFC as claimed in claim 1, wherein the PFC conversion circuit includes a boost follower.

5. The power supply system with PFC as claimed in claim 1, further comprising an opto-coupler, which is coupled between the communication protocol PD interface and the PFC conversion circuit, to deliver the disable signal from the communication protocol PD interface to the PFC conversion circuit.

6. The power supply system with PFC as claimed in claim 1, wherein the communication protocol PD interface determines whether the electrical power of the adapter output power is lower than the power threshold according to a current sense signal of an adapter output current of the adapter output power which is sensed by a current sense circuit coupled to the AHB flyback converter.

7. The power supply system with PFC as claimed in claim 1, wherein the communication protocol PD interface determines whether the electrical power of the adapter output power is lower than the power threshold according to an adapter output voltage of the adapter output power, a conduction status of the power path switch and/or a second communication protocol information.

8. The power supply system with PFC as claimed in claim 1, wherein the first voltage threshold is related to an adapter output voltage of the adapter output power.

9. The power supply system with PFC as claimed in claim 1, wherein the communication protocol PD interface determines whether the converted voltage is higher than the first voltage threshold according to whether a second winding voltage of the AHB flyback converter is higher than a winding voltage threshold, wherein the winding voltage threshold is related to an adapter output voltage of the adapter output power or a turns ratio between a primary windings and secondary windings of a transformer of the AHB flyback converter.

10. The power supply system with PFC as claimed in claim 9, wherein the communication protocol PD interface determines whether the converted voltage is higher than the first voltage threshold further according to a maximum of a duty ratio of the AHB flyback converter.

11. The power supply system with PFC as claimed in claim 1, wherein the communication protocol PD interface determines that the electrical power of the adapter output power is lower than the power threshold according to that the adapter output voltage is lower than a first adapter output voltage threshold, wherein the first adapter output voltage threshold is related to an upper limit of an adapter output current of the adapter output power.

12. The power supply system with PFC as claimed in claim 11, wherein after the PFC conversion is disabled by the PFC conversion circuit, when the communication protocol PD interface determines that the electrical power of the adapter output power is not lower than the power threshold according to that the adapter output voltage is higher than a second adapter output voltage threshold, the disable signal stops disabling the PFC conversion.

13. A control method of a power supply system, comprising:
rectifying an AC input power to generate a rectified power;
performing a PFC conversion on the rectified power to generate a converted power, and determining whether to disable the PFC conversion according to a disable signal;
performing a DC-DC conversion on the converted power to generate an adapter output power;
determining the adapter output power according to a first communication protocol information, and controlling a power path switch to deliver the adapter output power to a power supply pin; and
generating the disable signal to disable the PFC conversion when an electrical power of the adapter output power is lower than a power threshold, and a converted voltage of the converted power is higher than a first voltage threshold.

14. The control method as claimed in claim 13, further comprising: when the PFC conversion is disabled, performing a bypass coupling operation, as thus the converted voltage is equal to a rectified voltage of the rectified power.

15. The control method as claimed in claim 13, further comprising: after the PFC conversion is disabled, when the converted voltage is lower than a second voltage threshold, the disable signal stopping disabling the PFC conversion, wherein the first voltage threshold is not lower than the second voltage threshold.

16. The control method as claimed in claim 13, further comprising: sensing a current sense signal of an adapter output current of the adapter output power to determine whether the electrical power of the adapter output power is lower than the power threshold.

17. The control method as claimed in claim 13, further comprising: determining whether the electrical power of the adapter output power is lower than the power threshold according to an adapter output voltage of the adapter output power, a conduction status of the power path switch and/or a second communication protocol information.

18. The control method as claimed in claim 13, the first voltage threshold is related to an adapter output voltage of the adapter output power.

19. The control method as claimed in claim 13, further comprising: determining whether the converted voltage is higher than the first voltage threshold according to whether a second winding voltage is higher than a winding voltage threshold, wherein the winding voltage threshold is related to an adapter output voltage of the adapter output power or a turns ratio between a primary windings and a secondary windings of a transformer.

20. The control method as claimed in claim 19, further comprising: determining that the electrical power of the adapter output power is lower than the power threshold according to that the adapter output voltage is lower than a first adapter output voltage threshold, wherein the first adapter output voltage threshold is related to an upper limit of an adapter output current of the adapter output power.

21. The control method as claimed in claim 20, further comprising: after the PFC conversion is disabled, when the electrical power of the adapter output power is not lower than the power threshold according to that the adapter output voltage is higher than a second adapter output voltage threshold, the disable signal stopping disabling the PFC conversion.

\* \* \* \* \*